June 4, 1963   F. V. CIERI   3,091,799
STUFFING HORN
Filed Nov. 3, 1960
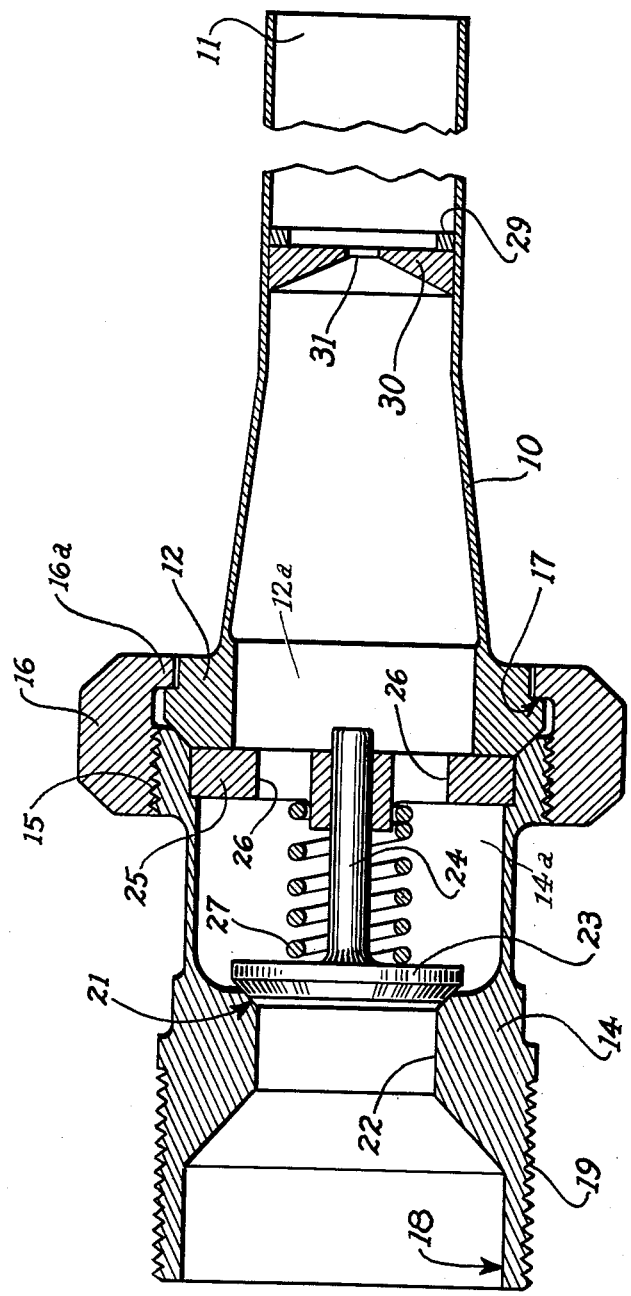
INVENTOR.
Frank V. Cieri
BY Davis Hoxie Faithfull
& Hapgood ATTORNEYS

United States Patent Office 3,091,799
Patented June 4, 1963

3,091,799
STUFFING HORN
Frank V. Cieri, Millbrae, Calif., assignor to The De Laval Separator Company, Poughkeepsie, N.Y., a corporation of New Jersey
Filed Nov. 3, 1960, Ser. No. 67,109
6 Claims. (Cl. 17—41)

This invention relates to apparatus for continuously filling casings with a meat emulsion, as in the production of bologna, frankfurters, sausage, etc. More particularly, the invention has reference to an improved stuffing horn for such apparatus.

Apparatus of the type described, as commonly made, includes a batch tank for receiving the meat emulsion, and means operable to feed the emulsion from the tank through a pipe leading to a plurality of stuffing horns, each of which serves to inject the emulsion into a casing for the frankfurter, bologna, or the like. The stuffing horn is essentially a tube so dimensioned that the casing can be gathered on the outer peripheral surface of the tube in preparation for the filling operation. That is, the casing is a flexible sleeve-like membrane having an open end into which the outlet end of the stuffing horn tube is inserted, the casing then being gathered on the tube until the tube outlet is opposite the closed end of the casing. By means of a lever located adjacent the stuffing horn, the operator manipulates a valve to control the flow of meat emulsion through the horn and into the casing, which is progressively drawn off the horn tube by the filling operation as it proceeds. When the length of casing has been filled, the operator closes the valve, after which the open end of the casing is closed and tied.

The tube of the stuffing horn must be long enough so that the casing can be gathered on the tube and must have an outer diameter such that the tube fits fairly snugly into the casing when it is so gathered. Thus, a horn suited for filling a casing of relatively small diameter (such as 24 mm., as for individual frankfurters) would be unsuited for filling a casing of substantially larger diameter, such as a casing for bologna. Since the larger diameter casings require horn tubes of corresponding larger diameter, provision must be made for substituting horns of different sizes in the filling or stuffing apparatus.

Usually, the batch tank for the meat emulsion is provided with a pneumatically operated piston to force the emulsion through the stuffing horn. However, in an improved form of such apparatus, the batch tank is replaced by a feed hopper leading to a rotary pump which delivers the meat emulsion under pressure to each stuffing horn.

The operation of such continuous casing fillers as made heretofore has not been entirely satisfactory due to the inclusion of air pockets in the finished product. This has been true even with respect to improved fillers in which the meat emulsion is subjected to vacuum treatment prior to the filling operation. These air pockets are readily discernible when the product is sliced, as they tend to give the sliced bologna or other product a lace-like appearance rather than the appearance of solid meat.

The principal object of the present invention, therefore, is to provide casing filling apparatus of the type described with an arrangement for avoiding air pockets in the finished product.

I have discovered that by providing such apparatus with a stuffing horn of a certain construction according to the present invention, air pockets can be substantially or entirely eliminated in the finished product. More particularly, the stuffing horn comprises the usual tubular member on which the casing is adapted to be gathered, a housing providing a valved passage through which the meat emulsion is supplied to the tubular member, and means in the tubular member forming a restricted orifice for flow of the emulsion from the valved passage to the outlet of the tubular member. The valve element for the passage is biased toward its closed position but opens automatically against its biasing or loading means when the pressure of the meat emulsion at the inlet of the valve housing rises sufficiently, due to operation of the pump or other means for feeding the emulsion to the stuffing horn. Thus, both the loaded valve element in the housing and the restricted orifice in the tubular member create back pressure on the meat emulsion and serve to reduce the back pressure in two stages as the emulsion is forced through the valved passage and then through the restricted orifice. In addition, the loaded valve serves to stop the emulsion flow automatically when the feed pressure is cut off, thereby obviating any need for the usual hand-operated lever valve associated with the stuffing horn.

It is not entirely clear how the new stuffing horn functions to eliminate air pockets in the finished product. However, it appears that the multiple squeezings of the meat emulsion as it approaches the valve and then the orifice, and the releasing of pressure as the emulsion passes through each of these, act to agglomerate air in the emulsion in such a way that the air escapes from the outlet end of the horn and through the open end of the casing by way of the space between the outer peripheral surface of the horn and the casing gathered thereon.

For a better understanding of the invention, reference may be had to the accompanying drawing in which the single illustration is the longitudinal section view of a preferred form of the new stuffing horn.

The stuffing horn as illustrated comprises an elongated tubular member 10 which is open at both ends and is provided at its outer end with an emulsion outlet 11. At its inner end, the tube 10 is exteriorly flanged as shown at 12, this flange surrounding an opening 12a for entrance of the emulsion into the tube. From the flange 12, the tube tapers gradually to a portion of the tube which is of uniform diameter and which extends from the tapered portion to the outer end of the tube. It will be understood that the length of the tube 10 from its outer end to the inner flange 12 is sufficient for gathering the casing (not shown) on this length of the tube, and the portion of the tube adjacent the inner flange 12 is about the same in diameter as the casing, so that a substantial portion of the casing can be gathered on the tapered part of the tube and there will be an air escape path from the outlet end of the tube to the open end of the casing, by way of the clearance between the outer peripheral surface of the tube and the casing gathered thereon. With this construction of the tube 10, its outer or reduced portion can be used by the operator as a handle during the stuffing operation.

A valve housing 14 is connected to the tube 10 at its enlarged or entrance end. At its end adjacent the tube, the valve housing 14 is externally threaded as shown at 15, and a nut 16 is screwed on this threaded portion. The nut 16 has an annular internal flange 16a engageable with a shoulder 17 on the tube flange 12. Accordingly, when the nut 16 is tightened on the housing threads 15, the engagement of flange 16a with shoulder 17 draws the parts 10 and 14 together in end-to-end relation, thereby clamping a beveled annular surface of the valve housing against a mating beveled surface of the tube 10. Thus, the nut 16 constitutes a releasable member connecting the valve housing to the tubular member.

The valve housing 14 is of generally hollow cylindrical shape open at both ends. The open end of this housing remote from tube 10 forms an emulsion inlet 18. The inlet end portion of housing 14 is externally threaded as shown at 19, whereby the housing can be screwed into the usual supply pipe (not shown) through which the meat emulsion is forced from a container or feed hopper as previously described.

Intermediate its ends, the valve housing 14 is provided internally with a frusto-conical valve seat 21 partly defining a passage 22 leading from the emulsion inlet 18 to the entrance end of tube 10. A frusto-conical valve element 23 is adapted to engage the seat 21 to close the passage 22 and thereby cut off the supply of emulsion to the tube. A central stem 24 on the valve element has a sliding fit in a spider plate 25 extending across the entrance opening of tube 10, this plate being clamped between the adjacent end of the tube and an internal shoulder of the housing 14. The plate 25 is provided with holes 26 through which the meat emulsion is adapted to pass from the valve housing into the tube 10. A spring 27 is coiled around stem 24 and is compressed between valve element 23 and the spider plate 25. Therefore, the spring 27 forms a biasing means normally urging the valve element 23 against its seat to close passage 22. However, the outer surface of valve element 23, that is, its surface closing passage 22 when the valve is seated, is exposed to the emulsion pressure in the housing inlet 18, so that when this pressure exceeds a certain valve (as by operation of the feeding means to force the emulsion through the stuffing horn), the valve is automatically opened against the action of spring 27 to allow flow of the emulsion through the horn.

Within the tube 10 is a retaining ring 29, which may be sweated in place in the tube. An orifice plate 30 has a sliding fit in the tube and is held against outward displacement in the tube by engagement with the retaining ring 29, which forms an internal shoulder facing valve element 24. The plate 30, which is circular has a central orifice 31 forming a restricted opening for passage of the emulsion to the tube outlet 11. It will be apparent that the orifice plate 30 is held against ring 29 by the pressure of the meat emulsion which is being forced through the stuffing horn; but when the tube 10 is detached from valve housing 14, the orifice plate may be removed from the entrance end of the tube and replaced by a plate having another sized orifice. As shown, the orifice plate 30 is located in the reduced portion of tube 10, that is, the portion having a uniform diameter, so that the orifice 31 is spaced a substantial distance from the tube outlet 11 as well as from the enlarged entrance end of the tube.

In the operation of the illustrated form of the stuffing horn, the meat casting is gathered on the outer peripheral surface of tube 10 with the open inner end of the casing opposite flange 12 and the closed outer end of the casing opposite the emulsion outlet 11, as previously described. The operator then starts the pump or other means (not shown) for initiating feed of the meat emulsion to the stuffing horn. In starting a series of filling operations, the emulsion will normally be fed through the valve 21—23 and orifice 31 to the horn outlet 11 before the first casing is gathered on the tube 10, thereby driving out the air in the stuffing horn. Thus, after each casing is filled, the stuffing horn (and the feed line leading thereto) will be left filled with emulsion and ready for filling the next casing gathered on the tube 10.

During the filling of a casing, the valve element 23 is held open against spring 27 by the feed pressure on the emulsion at the inlet side of the valve. Due to the action of spring 27 and the flow restriction provided by valve 21—23, this valve imposes a substantial back pressure on the emulsion which is being fed continuously to the stuffing horn through the expansion chamber 14a located downstream from the seat 21 in valve housing 14. Also, the orifice plate 30 imposes a further back pressure on the emulsion fed to the stuffing horn. As the emulsion flows through the restricted passage of valve 21—23 and into the expansion chamber 14a, the pressure on the emulsion is reduced quite suddenly; and again as the emulsion passes through the restricted orifice 31, the pressure on the emulsion is reduced quite suddenly. This series of actions on the emulsion serves to release air which would otherwise be occluded by the emulsion entering the casing from outlet 11 so as to form air pockets in the finished product. The air thus released from the emulsion escapes through the open end of the casing by flowing around the outlet end of tube 10 and then back along the outer peripheral surface of the tube between the latter and the casing gathered thereon.

When the filling of each casing is completed, the feed to the stuffing horn is arrested, as by stopping the pump, piston or other feeding means. As a result, the pressure on the emulsion in the valve housing inlet 18 decreases to the point where valve 21—23 is automatically closed by the biasing action of spring 27. This prevents spillage of emulsion from the tip or outlet of the horn. When the feed is resumed after gathering the next casing on tube 10, the valve 21—23 automatically opens to permit restricted passage of the emulsion therethrough. Consequently, the valve element 23 serves the dual functions of imposing a substantial back pressure on the emulsion and automatically opening and closing the restricted valve passage in response to starting and stopping of the feed to the stuffing horn.

When the apparatus is to be changed for filling casings of a different size, the nut 16 is removed to permit replacement of tube 10 by a tube of proper size to accommodate the different casing, the nut then being screwed back on the housing threads 15 to secure the new tube in place. Also, to accommodate emulsions of different consistency or viscosity, the orifice plate 30 may be replaced by a plate having an orifice 31 of different size. For most purposes, the orifice 31 will have a diameter between ¼ inch and 1¼ inch, depending upon the stiffness of the emulsion.

I claim:

1. A stuffing horn for ejecting meat emulsion under pressure into a tubular casing, said horn comprising an elongated tubular member having an emulsion entrance opening at one end and an emulsion outlet at the opposite end, the tubular member also having an outer peripheral surface on which the casing is adapted to be gathered for receiving emulsion from said outlet, said surface being adapted to form with said casing a gas escape passage from said outlet to atmosphere, a valve housing connected to the tubular member and having an emulsion inlet, the valve housing also having a valve seat partly defining a valved passage leading from the housing inlet toward said entrance opening of the tubular member, a valve element coacting with said seat and movable toward and away from the seat, said housing forming an expansion chamber located downstream from the valve seat and through which said valved passage is connected to said entrance opening of the tubular member, biasing means normally urging the valve element toward said housing inlet and against the seat to substantially close said passage, the valve element having a surface exposed to the emulsion pressure in said housing inlet and operable by said pressure to move the valve element away from the seat against said biasing means and thereby open the passage, and means in the tubular member forming a restricted orifice for flow of emulsion from said valved passage to said outlet of the tubular member, said orifice being substantially more restricted than said emulsion outlet to provide a sudden release of pressure on the emulsion in advance of said outlet.

2. A stuffing horn according to claim 1, comprising also a releasable member connecting the valve housing to the tubular member, the tubular member having an internal shoulder facing said valve element, said orifice forming means being an orifice plate retained against said shoulder, and removable from the tubular member through said entrance opening thereof.

3. A stuffing horn according to claim 1, in which the tubular member is tapered toward said outlet end.

4. A stuffing horn according to claim 1, comprising also a spider plate extending across said entrance opening of the tubular member and having holes for passage of the emulsion, the valve element having a stem slidable in and guided by said plate.

5. A stuffing horn according to claim 1, comprising also a spider plate extending across said entrance opening of the tubular member and having holes for passage of the emulsion, the valve element having a stem slidable in and guided by said plate, said valve housing and tubular member being releasably interconnected and said plate being clamped between the housing and tubular member.

6. A stuffing horn according to claim 1, comprising also a spider plate extending across said entrance opening of the tubular member and having holes for passage of the emulsion, the valve element having a stem slidable in and guided by said plate, said valve housing and tubular member being releasably interconnected and said plate being clamped between the housing and tubular member, said biasing means being a spring coiled around said stem and compressed between said plate and valve element.

References Cited in the file of this patent

UNITED STATES PATENTS

| | | |
|---|---|---|
| 1,297,312 | Barker | Mar. 18, 1919 |
| 1,362,535 | Hughes | Dec. 14, 1920 |
| 2,268,119 | Honstetter | Dec. 30, 1941 |
| 2,871,508 | Hill | Feb. 3, 1959 |
| 2,905,967 | Hensgen et al. | Sept. 29, 1959 |